United States Patent

[11] 3,599,106

| [72] | Inventor | Elias Snitzer<br>Wellesley, Mass. |
|---|---|---|
| [21] | Appl. No. | 773,888 |
| [22] | Filed | Nov. 6, 1968 |
| [45] | Patented | Aug. 10, 1971 |
| [73] | Assignee | American Optical Corporation<br>Southbridge, Mass. |

[54] HIGH INTENSITY-HIGH COHERENCE LASER SYSTEM
10 Claims, 5 Drawing Figs.

[52] U.S. Cl.......................................... 330/4.3, 331/94.5
[51] Int. Cl........................................... H01s 3/14
[50] Field of Search............................. 330/4.3; 331/94.5

[56] References Cited
UNITED STATES PATENTS

| 3,258,717 | 6/1966 | Katzman...................... | 331/94.5 |
| 3,379,998 | 4/1968 | Soules et al.................. | 331/94.5 |

*Primary Examiner*—Rodney D. Bennett, Jr.
*Assistant Examiner*—Joseph M. Potenza
*Attorneys*—William C. Nealon, Noble S. Williams and Robert J. Bird

ABSTRACT: A gas laser oscillator optically coupled to one or more glass laser amplifiers is provided. A high output from the gas laser is optically coupled to the single lowest order mode of the first stage of the glass amplifier. By matching the output of the gas laser to the peak of the fluorescent emission of the glass laser an amplified output results which output has high intensity and high coherence.

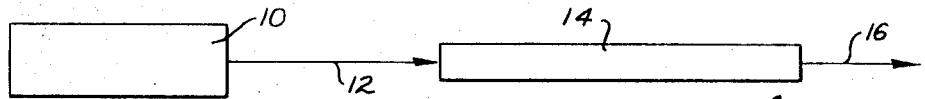
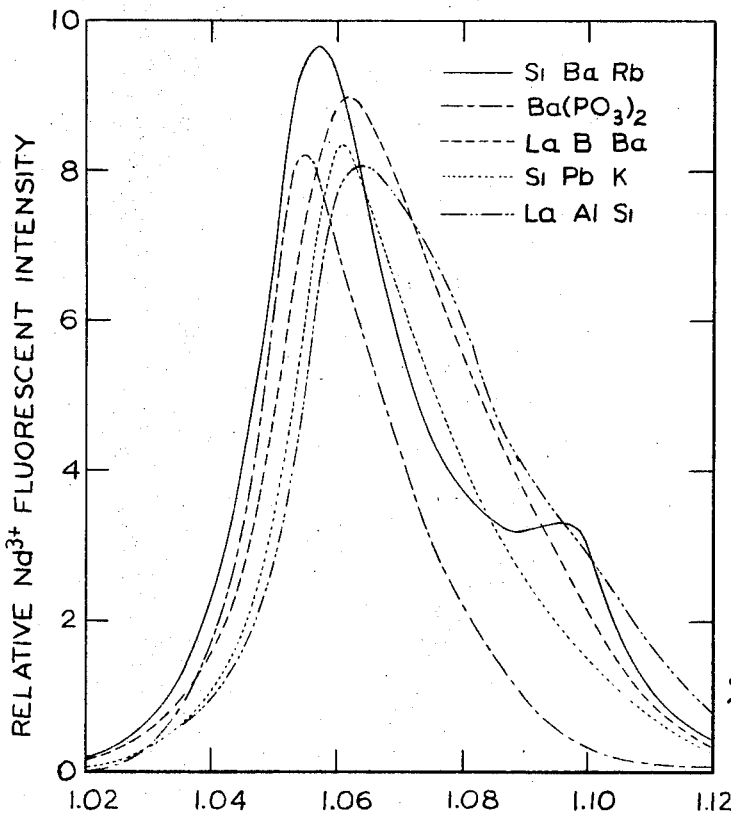
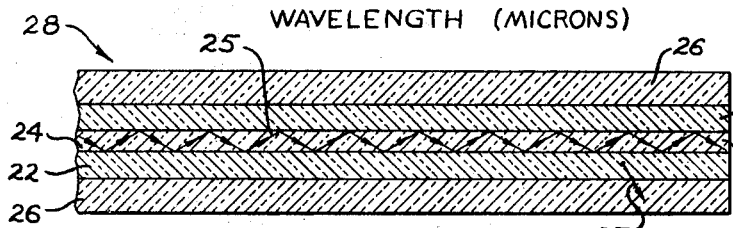
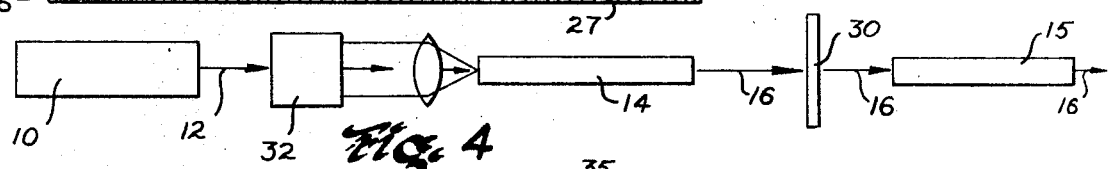
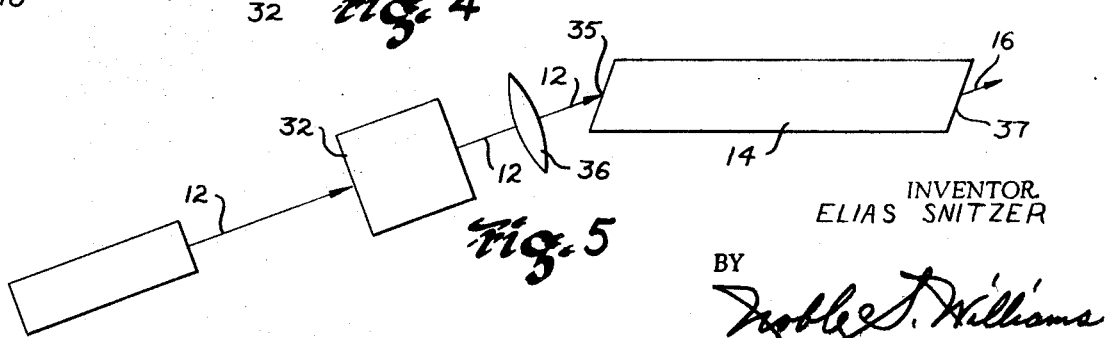
INVENTOR
ELIAS SNITZER

HIGH INTENSITY-HIGH COHERENCE LASER SYSTEM

BACKGROUND OF THE INVENTION

The field of the invention is laser devices; more specifically, laser devices employing laser oscillators and laser amplifiers.

In the prior art problems have arisen in taking holograms of large objects at great distances as is the case in satellite holography due to the inherent limitations of glass laser systems and gas laser systems. With the exception of a $CO_2$ gas laser, the gas laser has an inherent limitation because of its low power and it is difficult, therefore, to send a signal from a gas laser over a long distance. On the other hand, glass lasers typically have short coherence lengths. In many instances the coherence length of the glass laser is short when compared to the dimensions of the object from which information is sought. In the instant invention the desirable long coherence lengths of gas lasers and the high power of glass lasers are combined. This is accomplished by matching the output from a gas laser oscillator with the peak of the spontaneous emission of a glass amplifier. In order to accomplish amplification of a signal from a gas laser by a glass laser amplifier, it is important that the glass laser support only a small number or optimally only the lowest order mode of propagation.

SUMMARY

A high-intensity, high-coherence laser system is provided by amplifying the output of a gas laser by a glass laser amplifier. The glass laser amplifier is capable of supporting only a small number of modes or lowest order mode of propagation.

Accordingly, it is an object of this invention to provide a laser system with the high-coherence properties of a gas laser and the high intensity of a glass laser.

An additional object of this invention is to provide a laser system which will be capable of recording information of large objects at long distances.

BRIEF DESCRIPTION OF THE DRAWING

FIG. 1 is a diagrammatic illustration of an embodiment of the invention.

FIG. 2 is a graph showing the fluorescence of $Nd^{3+}$ in various glasses.

FIG. 3 is a diagram illustrating total internal reflection in a glass fiber.

FIG. 4 is a diagrammatic illustration of a second embodiment of the invention shown in FIG. 1.

FIG. 5 is a diagrammatic illustration of an additional embodiment of the invention as shown in FIG. 4.

Refer to FIG. 1, gas laser 10 is shown. The output indicated by arrow 12 of gas laser 10 is coupled to glass laser 14, is amplified and is emitted from glass laser 14 as is represented by arrow 16. In order to accomplish amplification of a signal from a gas laser by a glass laser several conditions must be satisfied, an important condition being that the spectral peak of fluorescence of glass laser 14 must match output 12 of gas laser 10.

Referring to FIG. 2, glass lasers have a broad emission band and most of the resulting spontaneous emission occurs at the peak of the curve. The band width for a neodymium-doped glass laser can be as wide as 15 nanometers or more. A typical gas laser oscillator, on the other hand, has many emission bands but these bands are characterized as being very narrow and are, in fact, less than 1 A. Maximum gain results when the gas laser emission line is the same as the peak of the spontaneous emission of the glass laser. In the preferred embodiment of the instant invention the 1.0621$\mu$ neon line of a helium-neon gas laser is used. In FIG. 2 the 1.06$\mu$ fluorescence of $Nd^{3+}$ in various glasses is shown. It is known to those skilled in the art that the peak of spontaneous emission of the active ions in a glass laser material can be controlled by the composition of the glass. In a typical neodymium doped glass laser the composition of the glass can control the peak of spontaneous emission within the range of from 1.047$\mu$ to 1.064$\mu$.

As was stated above, in a typical neodymium doped glass laser the efficient emission at approximately 1.06$\mu$ occurs at the peak of the fluorescence line and can be as wide as 15 nanometers. FIG. 2 shows the fluorescence curves for several glasses. The wavelength peak and linewidth for some glass hosts shown is given in the chart below.

| Host | Peak $\lambda(\mu)$ | Linewidth $\Delta\lambda$(nm.) |
| --- | --- | --- |
| Si Ba Rb | 1.057 | 26.0 nm. |
| Ba $(PO_3)_2$ | 1.054 | 24.5 nm. |
| La B Ba | 1.061 | 36.5 nm. |
| Si Pb K | 1.061 | 28.0 nm. |
| La Si Al | 1.064 | 38.0 nm. |
| Ge Ba Rb K | 1.061 | 34.0 nm. |

In the preferred embodiment of the instant invention the 1.0621-micron neon line of a helium-neon gas laser is propagated. The composition of glass laser 14 is so chosen that the peak of spontaneous emission for this amplifier matches the output of gas laser 10. The following composition for glass laser 14 has been found to have a fluorescence peak which matches output 12 of laser 10, that is, 1.0621$\mu$.

|  | Weight % |
| --- | --- |
| $SiO_2$ | 61.32 |
| $Na_2O$ | 11.75 |
| $K_2O$ | 2.94 |
| CaO | 12.25 |
| $TiO_2$ | 7.06 |
| $Sb_2O_3$ | 0.68 |
| $Nd_2O_3$ | 4.00 |

Applicant is not limiting his invention to this specific arrangement. Applicant has shown that it is possible for the output of a gas laser to be matched with the fluorescence peak of the glass laser. Other arrangements apparent to those skilled in the art are possible and are within the scope of the instant invention.

While the preferred embodiment of this invention calls for matching the peak of the fluorescence emission of the glass amplifier at the wavelength of the gas oscillator, it is understood that other embodiments can be utilized in which the gas oscillator wavelength is such as to be somewhere in the gain characteristics of the glass amplifier. For example, it is possible to amplify the 1.0798$\mu$ laser light from a He-Ne gas laser with neodymium. The device still operates as described previously but is not an optimal configuration. It is further understood that other gas lasers could be used in combination with other glass lasers as amplifiers which are doped with ions which lase in glass such as $Yb^{3+}$, $Er^{3+}$, $Tm^{3+}$ and $Ho^{3+}$. Furthermore, it is also contemplated to be within the scope of the invention to use crystalline solid state lasers as amplifiers in conjunction with gas lasers of appropriate wavelengths.

In each embodiment shown glass laser 14 is pumped in a conventional manner such as by a flash tube (not shown).

In order for the device to operate successfully it is necessary that signal 12 from gas laser 10 be larger than the equivalent input spontaneous emission of glass laser 14. The equivalent input of spontaneous emission power of glass laser 14 in watts is given by:

$$W_{sp} = 2\Delta\nu N h\nu \quad (1)$$

where $N$ is the number of wave guide modes propagating, 2 accounts for the two states of polarization per mode, $\Delta\nu$ is the linewidth in hertz and $h\nu$ is that the energy per photon. The expression $2\Delta\nu N$ given the photons per second for laser 14. Since the spontaneous emission power must be less than the input signal 12, the spontaneous emission input power can be decreased by decreasing the number of modes, $N$, of the above equation (1). As is shown by equation (1) any reduction of $N$ to a point where $W_{sp}$ is less than signal 12 will produce operative results. Best results are possible, however, when glass laser 14 supports only the single lowest order $HE_{11}$ mode since for a single lowest order mode, $N$ equals 1.

In the preferred embodiment of the invention, glass laser amplifier 14 is a fiber cable of supporting only the lowest order $HE_{11}$ mode. A neodymium-doped clad fiber can be designed so that only the $HE_{11}$ mode is permitted. The characteristics of the core and claddings of a fiber drawn in accordance with the instant invention and given in the following table and shown in FIG. 3.

| Comments | | Index of refraction | |
|---|---|---|---|
| | | Sodium D-line | 1.06μ |
| Core | Low-loss laser glass | $n_1 = 1.5165$ | 1.5054 |
| First cladding | | $n_2 = 1.5163$ | |
| Second cladding | Samarium-doped to absorb 1.06μ radiation. | $n_3 = 1.5179$ | 1.5078 |

In FIG. 3 first cladding 22 has an index of refraction, $n_2$, less than the index of refraction, $n_1$, of core 24. Since $n_2 < n_1$ total internal reflection is possible. Second cladding 26 has an index of refraction, $n_3$, greater than $n_2$ so that any 1.06μ radiation leaving the first cladding can enter the second and be absorbed by the samarium. The numerical aperture at 5893 A is $NA = \sqrt{n_1^2 - n_2^2} = 2.46 \times 10^{-2}$. Experimental results indicate that the above described fiber is a fiber which supports only the $HE_{11}$ mode for a fiber whose core diameter is 25μ.

The above described fiber is exemplary of a preferred embodiment of the invention. However, other fiber arrangements are possible.

The preferred method for reducing the number of travelling wave modes is by the use of a clad fiber whose cross-sectional area is small enough so that only the lowest order $HE_{11}$ mode is able to propagate. If the fiber has core 24 with a circular cross section of diameter $d$, an index of refraction for core 24, $n_1$, and an index of refraction for cladding 22, $n_2$, the $HE_{11}$ mode will be the only mode propagated if the following is satisfied:

$$\frac{\pi d}{\lambda} \sqrt{n_1^2 - n_2^2} < 2.405 \text{ where } \lambda \text{ is the wavelength of light.}$$

The modes referred to above are spacial wave guide modes associated with the propagation of light in one direction through a material. As has been shown a dielectric wave guide in a laser material is accomplished by cladding core 24 of laser material 28 with transparent cladding 22 of lower refractive index than said core. With such a cladding the number of modes which can be propagated is equal to the number of dielectric wave guide modes the structure is capable of supporting. The number of modes which can be propagated is proportional to the differences in the squares of the indices of refraction for the core of laser material and the cladding and also proportional to the cross-sectional area of the core.

In FIG. 3 core 24 is doped with a laserable quantity of neodymium ions. Core 24 is surrounded by first cladding 22 so as to give total internal reflection of the light as shown by arrow 25. Fiber 28 also has a second cladding 26 which is doped with ions capable of absorbing energy at the emissive wavelength of the core. Thus, as is shown by arrow labeled 27, any radiation passing through the first cladding will be absorbed by the active ions within cladding 26. In the case of neodymium core, samarium ions in the second cladding are normally employed as absorbing ions. However, any other ions known to absorb at 1.06 microns and that are also transparent to the pump light are contemplated and are within the scope of the invention.

The preferred method of amplifying energy of a gas laser by a glass laser is to do so with a single lowest order $HE_{11}$ mode fiber. However, any reduction in the number of travelling wave guide modes being propagated is helpful in practicing the invention. Accordingly, any mode reducing scheme or device can be successfully employed in connection with glass laser 14. For example, a mode selecting device for limiting the number of modes in a solid rod of laser material is set forth in U.S. Patent Application Ser. No. 765,099 entitled, "Laser Preamplifier" by Elias Snitzer filed on Oct. 4, 1968 (docket number AO-1841) and assigned to the assignee of the instant application, the teachings of which are herein incorporated by reference.

Referring to FIG. 4 the equivalent input spontaneous emission to above can be further reduced by a narrow band filter 30 optically centered at 1.0621μ. For optimum operation it is necessary that the relationship $SG >> W_{sp}(G-1)$. $S$ is signal power, $G$ is the gain of the glass laser 14. Since $W_{sp}$ is the total spontaneous emission, $W_{sp}$ is proportional to $N$, where $N$ is number of modes. Therefore, optimum results occur when laser 14 is capable of supporting the lowest order mode and the composition is such that the peak of spontaneous emission occurs at 1.0621μ.

Isolator 32 may be placed in the optical path of output 12 to reduce feedback of the spontaneous emission of glass laser 14 from the two mirrors (not shown) of gas laser 10. A problem arises with respect to reflection from the end mirror (not shown) in gas laser 10, since the light from the gas laser is emitted so that its wave front is parallel to this end mirror. When the gas laser light indicated by arrow 12 is imaged onto glass laser 14 the alignment can cause the spontaneous emission for glass laser 14 to reflect back from the end mirror of gas laser 10 onto the glass laser again. To prevent this feedback a unidirectional device (isolator 32) between gas laser 10 and glass laser 14 can be employed. Such a device can comprise a Faraday rotator which would permit plane polarized light to travel from gas laser 10 to laser 14, but would not permit light to go in the opposite direction, or a combination of ¼-wave plate and polarizer could be employed. Such isolators permit output 12 from gas laser to fall on glass laser 14 but would not allow spontaneous emission from glass laser 14 to be reflected back from the end mirror of gas laser 10 onto laser 14.

Also to prevent feedback the Fresnel reflection for the ends of glass laser 14 can be reduced to zero. Such can be accomplished by antireflection coating on the ends of laser 14. Alternatively, the ends 35, 37 of laser 14 can be cut at an angle of approximately 10° with respect to the axis of laser 14 as is shown in FIG. 5. Thus, the Fresnel reflection deflected light away from the axis of laser 14 so that virtually no light is returned back down laser 14.

In the case were laser 14 is a fiber, the fiber laser will have a numerical aperture given by $\sqrt{n_1^2 - n_2^2}$. To couple the light from gas laser onto the fiber, lens 36 whose numerical aperture is approximately equal to that for the fiber can be successfully employed to image gas laser output 12 more uniformly onto glass laser 14.

The invention up to this point has been described with regard to one glass laser amplifier amplifying the output of a gas laser. FIG. 4 shows a second stage of amplification produced by a second glass laser amplifier 15. Optically arranged in the path of amplified output 16 is narrow band filter 30. As was explained earlier it is necessary to filter the output of the first stage of amplification so as to reject the spontaneous emission in the wavelength region away from the desired 1.0621μ radiation. Once the signal strength is high enough to be larger when compared to the total spontaneous emission, filtering is no longer required. Accordingly, a plurality of optically coupled glass laser amplifiers is contemplated and within the scope of this invention.

I claim:

1. A high-intensity, high-coherence laser device comprising a gas laser oscillator for producing a highly coherent laser emissive signal at a precise predetermined wavelength and a nongaseous laser amplifier in optical alignment with the signal emitted from said gas laser oscillator, said nongaseous laser amplifier being capable of providing gain to said signal from said gas laser oscillator so as to intensify said signal.

2. A high-intensity, high-coherence laser device comprising a gas laser oscillator for producing a highly coherent laser emissive signal at a precise predetermined wavelength, a nongaseous laser amplifier in optical alignment with the signal emitted from said gas laser oscillator, said nongaseous laser amplifier being capable of providing gain to said signal from said gas laser oscillator so as to intensify said signal, and means for limiting the number of modes capable of being propagated in said nongaseous laser amplifier so as to reduce spontaneous emission in said amplifier.

3. The laser device as set forth in claim 2 wherein said nongaseous laser amplifier is a glass laser.

4. The laser device as set forth in claim 3 wherein the composition of said glass laser is chosen to have a fluorescence peak which peak matches the output of said gas laser.

5. The laser device as set forth in claim 4 wherein said glass laser is a fiber capable of supporting only the $HE_{11}$ mode.

6. The laser device as set forth in claim 2 also containing means for preventing feedback of spontaneous emission onto said nongaseous laser.

7. The laser device as set forth in claim 6 wherein said means for prevented feedback is an isolator.

8. The laser device as set forth in claim 6 wherein said means for preventing feedback is beveled ends on said nongaseous laser, said beveled ends being so cut as to direct spontaneous emission away from the optical axis of said nongaseous laser.

9. The laser device as set forth in claim 7 wherein said isolator is a Faraday rotator.

10. The laser device as set forth in claim 2 wherein said nongaseous laser amplifier comprises a plurality of nongaseous amplifiers and a narrow band filter arranged in the optical path of said nongaseous amplifiers, said narrow band filter providing means for rejecting undesirable spontaneous emission.